(12) United States Patent
Elias et al.

(10) Patent No.: US 10,133,611 B2
(45) Date of Patent: Nov. 20, 2018

(54) SIDE CHANNEL COMMUNICATION HARDWARE DRIVER

(71) Applicant: Synopsys, Inc., Mountain View (CA)

(72) Inventors: Andrew Alexander Elias, Ottawa (CA); Jean-Pierre Thibault, Ottawa (CA); Nick Bowler, Ottawa (CA); Steven Lougheed, Ottawa (CA); Michael James Lewis, Ottawa (CA)

(73) Assignee: Synopsys, Inc., Mountain View (CA)

( * ) Notice: Subject to any disclaimer, the term of this patent is extended or adjusted under 35 U.S.C. 154(b) by 960 days.

(21) Appl. No.: 14/508,069

(22) Filed: Oct. 7, 2014

(65) Prior Publication Data

US 2016/0098376 A1  Apr. 7, 2016

(51) Int. Cl.
*G06F 9/54* (2006.01)

(52) U.S. Cl.
CPC ..................... *G06F 9/54* (2013.01)

(58) Field of Classification Search
CPC ........................................................ G06F 9/54
USPC ........................................................ 709/212
See application file for complete search history.

(56) References Cited

U.S. PATENT DOCUMENTS

| | | | | |
|---|---|---|---|---|
| 6,173,343 B1* | 1/2001 | Delorme | ................. | G06F 13/22 710/41 |
| 6,298,370 B1* | 10/2001 | Tang | ..................... | G06F 9/5044 718/100 |
| 7,904,878 B2* | 3/2011 | Kolathur | ................... | G06F 8/76 717/104 |
| 8,732,381 B2* | 5/2014 | Myrah | .................. | G06F 13/102 710/112 |
| 8,848,910 B2* | 9/2014 | Mulcahy | ............ | H04N 21/4627 380/200 |
| 2003/0061409 A1* | 3/2003 | RuDusky | .............. | G06F 3/0481 710/8 |
| 2006/0153572 A1* | 7/2006 | Champion | ......... | H04B 10/1143 398/140 |
| 2008/0159532 A1* | 7/2008 | Verma | .................... | G09G 5/006 380/210 |

(Continued)

FOREIGN PATENT DOCUMENTS

EP    3204863        8/2017
EP    3204863  A1 *  8/2017

OTHER PUBLICATIONS

Kroah-Hartman et al., "Linux Device Drivers, 3rd Edition", "Chapter 15: Memory Mapping and DMA", 2005.*

(Continued)

*Primary Examiner* — O. C. Vostal
(74) *Attorney, Agent, or Firm* — Jaquez Land Greenhaus LLP; Bruce W. Greenhaus, Esq.

(57) ABSTRACT

A system and method for communicating data between a first software and a second software located on first and second devices, respectively, has a hardware driver and memory associated with each device. Each communication of data from the first software to the second software allocates memory to manage data to be communicated from the first software to the second software, provides memory allocation information to the hardware driver associated with the first software, and transmits the data from the first hardware driver to the second hardware driver for delivery to the second software via the memory associated with the second software.

3 Claims, 3 Drawing Sheets

(56) References Cited

U.S. PATENT DOCUMENTS

| | | | |
|---|---|---|---|
| 2009/0276765 A1* | 11/2009 | Das | G06F 8/4441 |
| | | | 717/154 |
| 2010/0131681 A1 | 5/2010 | Reddy et al. | |
| 2011/0022739 A1* | 1/2011 | Guillerm | G09G 5/006 |
| | | | 710/18 |
| 2013/0148943 A1* | 6/2013 | Velasco | H04N 21/4367 |
| | | | 386/259 |
| 2013/0346700 A1* | 12/2013 | Tomlinson | G06F 9/526 |
| | | | 711/133 |
| 2014/0181573 A1* | 6/2014 | Goss | G06F 13/40 |
| | | | 714/5.11 |
| 2014/0196159 A1* | 7/2014 | Mangalam-Palli | G06F 21/10 |
| | | | 726/30 |
| 2014/0359044 A1* | 12/2014 | Davis | H04L 45/60 |
| | | | 709/213 |

OTHER PUBLICATIONS

Digital Content Protection LLC, "High-bandwidth Digital Content Protection System", "Mapping HDCP to HDMI", "HDCP on HDMI Specification Revision 2.2", 2012.*
International Search Report, PCT/IB2014/002048, 3 pages, dated Mar. 16, 2015.
International Written Opinion, PCT/IB2014/002048, 4 pages, dated Mar. 16, 2015.
Beyer, Steffen, Extended Search Report received from the EPO dated Jun. 7, 2018 for appln. No. 14903767.3, 10 pgs.
Legare, Christian "Reworking the TCP/IP Stack for Use on Embedded IoT Devices", Micrium, Apr. 12, 2014, XP002781300, www.embedded.com/design/connectivity/4429865/Reworking-the-TCP-IP-stack-for-use-on-embedded-IoT-devices.

* cited by examiner

SIDE CHANNEL COMMUNICATION HARDWARE DRIVER

FIELD OF THE INVENTION

The present disclosure relates to encryption and content protection, specifically to the control channel used for authentication.

SUMMARY

In accordance with one embodiment, a system and method are provided for communicating data between a first software and a second software located on first and second devices, respectively. Each of the devices has a hardware driver and memory associated therewith. Each communication of data from the first software to the second software allocates memory to manage data to be communicated from the first software to the second software, provides memory allocation information to the hardware driver associated with the first software, and transmits the data from the first hardware driver to the second hardware driver for delivery to the second software via the memory associated with the second software. Each communication of data from the second software to the first software allocates memory to manage data to be communicated with the first software, provides memory allocation information to the first hardware driver, and transmits the data from the second hardware driver to the first hardware driver for delivery to the first software via the first memory.

In one implementation, the first software is a master software and the second software is a slave software. The hardware drivers preferably handle the time-critical components of the communication of data between the first and second software, to reduce the number of interrupts to the first and second software. The hardware driver that receives communicated data stores that data in the associated memory, and notifies the associated software that the data is available.

The foregoing and additional aspects and embodiments of the present disclosure will be apparent to those of ordinary skill in the art in view of the detailed description of various embodiments and/or aspects, which is made with reference to the drawings, a brief description of which is provided next.

Figure 1:
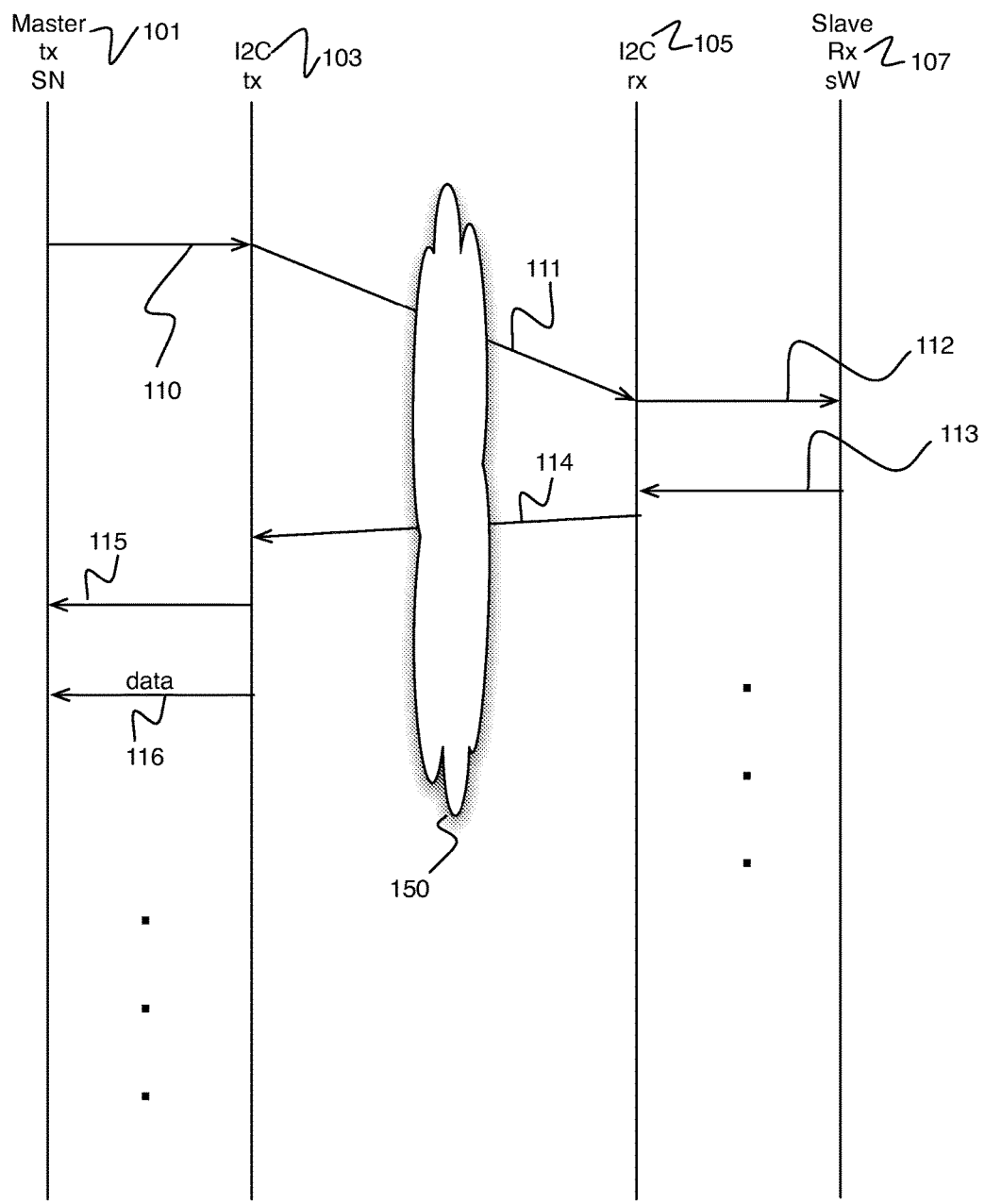
FIG. 1 illustrates a prior art message exchange for authentication over I2C.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

The HDCP content protection standard uses a side-band communication channel to perform authentication between an HDCP transmitter and an HDCP receiver. There are time limits for completing the authentication process. Certain steps within the authentication algorithm are also subject to time limits. While HDCP version 1.x was amenable to hardware (HW) implementation, the HDCP version 2.x is more complex and lends itself best to software (SW) implementation. However, the overhead of SW responding to interrupts (to service transfers) can jeopardize completion of the authentication within the allotted time(s).

Although the embodiment is described herein using HDCP as an example, it applies to any configurations where software performs time-sensitive data exchanges over a physical hardware channel, while the frequency of software interrupts need to be limited.

In the case of HDCP over HDMI, the side-band channel is Inter-integrated Circuit (I2C). When an I2C slave device cannot immediately respond to a transfer request, it is allowed to delay its response through the use of a mechanism called clock stretching. In practice, some I2C devices do not support clock stretching and are not able to interoperate with compliant devices, therefore the avoidance of clock stretching is desirable, which requires the I2C slave to be able to respond to transfer requests with minimal delay.

Referring to FIG. 1, the master transmit SW 101 starts an authentication process 110 via a I2C transmit side-channel 103, the start notification 111 is sent via a network 150 and is received in the I2C receive side 105 of the slave which generates an interrupt 112 for the slave receive SW 107. The receive SW transmits the required data 113 via the I2C side channel 105 which transmits 114 over the network 150. On the master side, the reception of the data 114 generates an interrupt 115 to the master SW 101. Several exchanges of data occur during the authentication process each involving interrupts to the master or slave SW, along with unpredictable response time.

In the case of HDCP over DisplayPort (DP), side-channel transfers are conducted over the auxiliary channel (AUX) and are limited to bursts of 16 bytes (or less). Larger quantities of data must be broken into multiple bursts, which results in a large number of SW interrupts.

There is also a need to abstract the side-channel interface from the SW to allow generic SW communication independent of the side-channel used (e.g. I2C or AUX).

Existing solutions to these problems include implementing the HDCP protocol entirely in HW, which is very costly. Another option is to tune the software to respond to the side-channel interrupts faster (e.g. by increasing the priority of these interrupts). Another solution is to simply tolerate the authentication failures resulting from the delays until the authentication eventually succeeds. However, this last solution results in poor user experience and interoperability problems.

In one embodiment, the side-channel communication can be off-loaded from the SW and implemented in a HW driver. The SW overhead is reduced and the response time is faster and more predictable therefore the protocol timing requirements can be met. This embodiment also abstracts the communication channel from SW, allowing a common SW to be used for different channels. The SW focuses on high-level messaging and protocol compliance while the HW is used to meet low level timing constraints. The manner in which the offloading is achieved depends on whether it resides in a "master" (transmitting) device or in a "slave" (receiving) device. The partitioning of the HW and SW components allows the SW to be agnostic to the communication channel. The HW driver handles the time-critical components of the communication, minimizing the number of interrupts to the SW. The partitioning allows for HW to handle the communications without waiting for the SW response.

Figure 2:
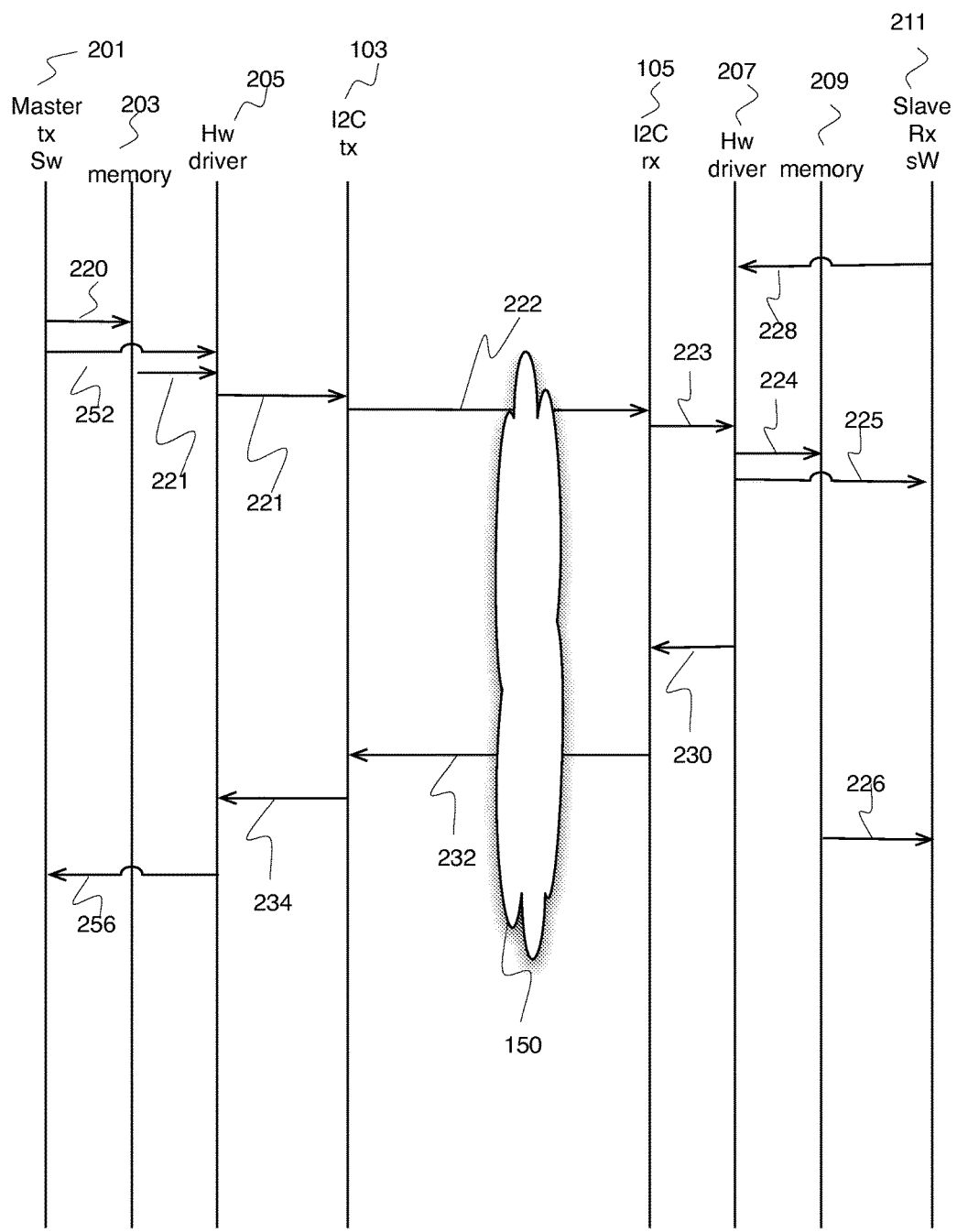
FIG. 2 illustrates an example of the use of a hardware driver for the sideband communication channel when a master writes to a slave.

FIG. 2 provides an example of a master writing to a slave. On the transmit (master) side 201, the SW places data 220 in memory 203. The SW gives the pointer and data size 252 to the HW driver 205. The HW driver 205 reads the data from memory 221 and makes it available to the I2C tx 103 for transmission 222 over the network 150 to the I2C RX 105, which in turns makes the data 223 available to the HW driver slave 207. ON the receive side, independent from the master's writing process, the slave SW 211 allocates memory space and provides the pointers to the memory space 228 to the HW driver. When data 223 is received by the HW driver 207, the HW driver 207 stores it into memory 209, and notifies the slave SW 225 that the data is available. At an appropriate time, the slave SW reads the data 226 from the memory 209. The timing of the slave SW reading from memory does not gate the following acknowledgement process, therefore does not add any delay in the writing process. The HW driver 207 acknowledges 230 the receipt of the data via the I2C RX 105, the acknowledgement is transmitted to the I2C TX 103 on the master side, which makes it available to the master HW driver 205. The acknowledgement is passed on to the master TX SW for processing.

Figure 3:
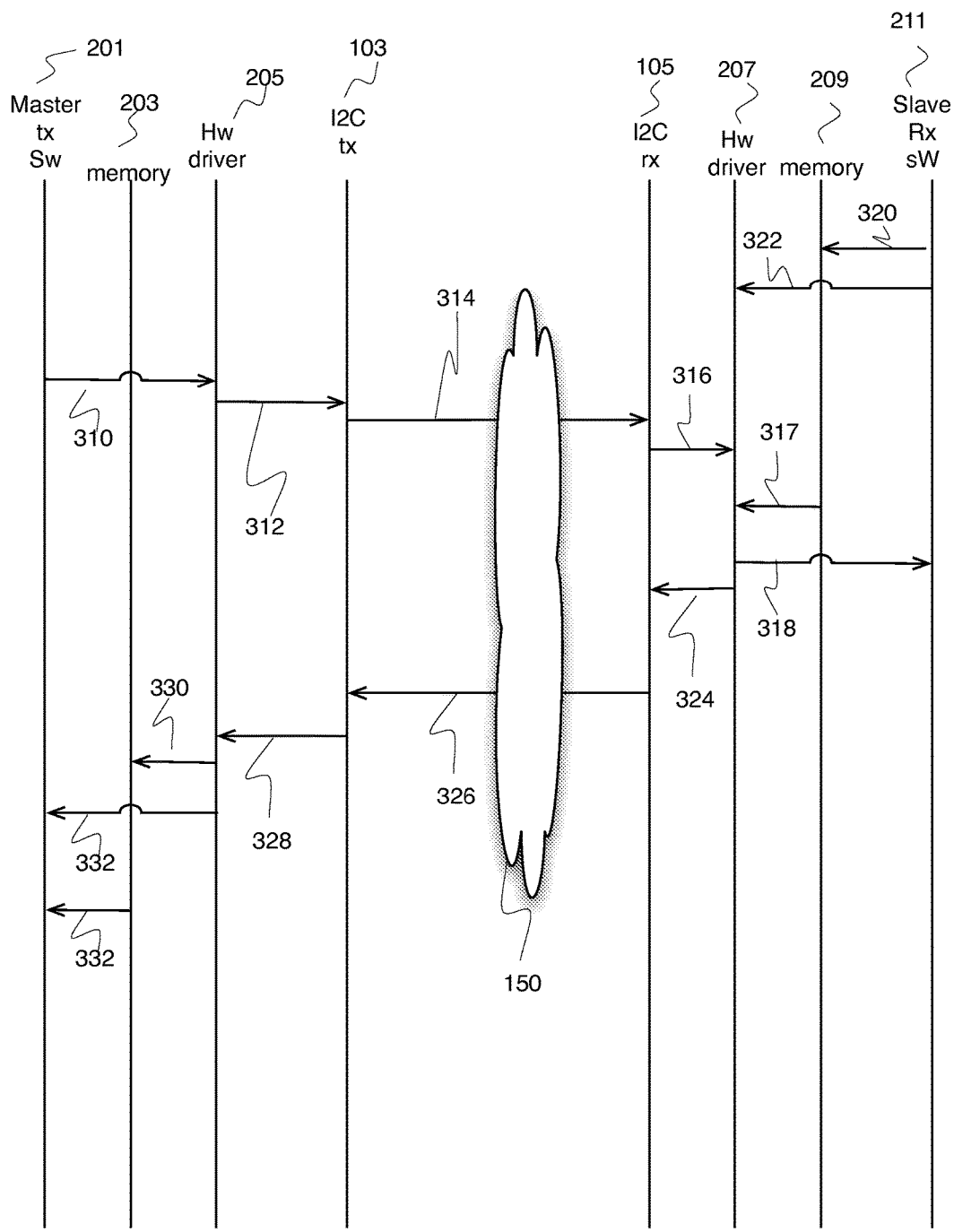
FIG. 3 illustrates an example of the use of a hardware driver for the sideband communication channel when a master reads from a slave.

FIG. 3 depicts an example where the master reads information from the slave. The slave SW 211 allocates a region of memory 320 and provides the pointer to the memory allocation 322 the slave HW driver 207. When the master SW 201 needs data from the slave SW 211, it sends a request 310 to the master HW driver 205, which in turn, sends the request 312 to the I2C TX 103. The request 314 is transmitted, over the network 150, to the I2C RX 105 of the slave device. The I2C RX 105, makes the request 316 available to the slave HW driver 207 which in turn reads the requested data 317 from the memory 209. The slave SW 211 may optionally be notified that the read has occurred 318. The HW driver 207 makes the requested data 317 available to the slave I2C 105 for transmission 326 to the master I2C 103 via the network 150. The master I2C 103 provides the data 328 to the HW driver 205, which in turn writes it into memory 203. The master SW is notified 332 that the requested data has been put in memory. The master SW 201 reads the data 332 at an appropriate time, without impacting other data transfers between the master and the slave.

Multiple memory regions may be allocated, each intended for different variables that are used in the higher-level protocol (e.g. HDCP authentication). Once this is done, the HW driver slave 207 responds to transfer requests via the I2C TX side channel 105 in a timely fashion without SW involvement.

The size of the SW transfer to memory need not be limited to what the underlying communication channel supports. The HW driver segments the transfer as per the channel requirements (e.g. in the case of AUX, which has max 16-byte bursts, the SW issue a single command to transfer 32 bytes into memory and notifies the HW driver. The HW driver does, in this case, two 16-byte bursts, and notify the SW only when both are completed. Channel-specific exceptions, such as, but not limited to, error conditions on the channel can be handled by the HW driver (by re-attempting the transfer until it completes successfully), without any SW involvement.

Each request (on the slave or master side) has an identifier (e.g. an address) that the HW driver can use to match to the memory region that should be used to write or read the data in the case of a write or read transfer, respectively. If there is no identifier match, the HW driver can wait for the SW to update the allocation(s) until something results in a match or, depending on the channel, it can decline the transfer. As in the transmit case, the SW is notified when data is fully transferred, possibly over many physical transfers (e.g. in the case of AUX).

If multiple memory allocations are required concurrently, the SW may optionally store a map of these allocations in memory and point HW to the location of this map. Instead of providing the HW driver with a single pointer, SW may provide multiple pointers, each intended for a different variable. The SW creates a lookup table to maintain the memory pointer for a variable and a lookup key that the HW uses to search the table. The use of a lookup table allows the SW to manage the allocations dynamically.

The term "variable" means any values (including constant values) transferred by a master to a slave (or vice versa) over a side channel.

The HW driver may collect statistics on successful and unsuccessful transfers. The SW may consult these statistics to decide whether to abort an outstanding command, or perhaps to diagnose interoperability problems.

Different communication channels may have different particularities that the HW driver can isolate from the SW, for example with respect to failures or maximum transmission size. In I2C (for HDMI), the master may lose arbitration of the physical channel to a different master, or the slave may answer a write with a negative acknowledge (NACK). In both cases, the HW driver can re-attempt the transfer until successful, without involving the SW. Similarly in AUX, the slave can respond negatively to the transfer request (with DEFER or NACK responses). Again, the HW driver can re-attempt until it's successful. The HW driver can implement any channel particularities while SW is agnostic to these and shielded from any additional interrupts required to manage them.

Optionally, if some variable is relatively small in size and/or expected to be read relatively frequently (e.g. a status variable), it may be kept into a HW register directly accessible by the HW driver without the need for SW to allocate memory and handle pointers. For example, the RxStatus in HDCP for HDMI. Instead of using system memory, the variable can be stored in HW. The HW driver provides dedicated storage space for this variable and provides SW with a mechanism to update the variable's value. The SW is no longer interrupted every time the variable is read. Optionally, the HW driver can inform the SW about the frequency at which these HW registers are accessed and the SW can access them regularly.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A communication system for performing authentication while communicating data between different devices, said system comprising:
   an HDCP (High-bandwidth Digital Content Protection) transmitter having a transmit hardware driver configured to perform data authentication for data to be sent to a different device;
   an external master software coupled to the transmit hardware driver;
   a first memory coupled to the transmit hardware driver;
   an HDCP receiver having a receive hardware driver configured to operate together with the transmit hardware driver to complete the data authentication, the transmit hardware driver in communication with the receive hardware driver over a communication network;
   a slave software coupled to the receive hardware driver; and
   a second memory coupled to the receive hardware driver for receiving from the receive hardware driver, the data to be authenticated;
   wherein several exchanges of data occur during the authentication process, each handled by the transmit hardware driver and the receive hardware driver without external support and wherein the slave software allocates memory within the second memory for the authenticated data.

2. The system of claim 1 in which said hardware drivers handle time-critical components of the authentication of data.

3. The system of claim 1 in which the receiver hardware driver stores said data in the second memory, and notifies the slave software that the data is available.

* * * * *